United States Patent [19]

Kobayashi et al.

[11] Patent Number: 4,983,802
[45] Date of Patent: Jan. 8, 1991

[54] DRAWING SYSTEM IN A WIRE-CUT ELECTRODISCHARGE MACHINE

[75] Inventors: Kazuo Kobayashi, Sagamihara; Hitoshi Miyahara, Yokohama; Hidemaru Nishikizawa, Hadano; Hironori Shimomoto; Osamu Maruyama, both of Ebina, all of Japan

[73] Assignee: Hitachi Seiko Ltd., Tokyo, Japan

[21] Appl. No.: 450,457

[22] Filed: Dec. 14, 1989

[51] Int. Cl.⁵ .............................. B23H 7/02
[52] U.S. Cl. .................. 219/69.12; 346/125; 364/474.26
[58] Field of Search ............... 346/118, 125, 33 MC; 33/1 M; 364/474.04, 474.26, 192, 193; 219/69.12, 69.13, 69.17, 69.2, 69.16, 69.15; 204/224 M

[56] References Cited

U.S. PATENT DOCUMENTS

| | | | |
|---|---|---|---|
| 2,812,229 | 11/1957 | Strimel | 346/125 |
| 3,614,372 | 10/1971 | Dulebohn | 219/69.15 |
| 3,673,372 | 6/1972 | Veroman et al. | 219/69.2 |
| 4,426,783 | 1/1984 | Gerber et al. | 33/1 M |
| 4,678,976 | 7/1987 | Inoue | 219/69.17 |

FOREIGN PATENT DOCUMENTS

| | | | |
|---|---|---|---|
| 120204 | 10/1984 | European Pat. Off. | 364/474.26 |
| 62-42926 | 3/1987 | Japan . | |
| 137303 | 6/1988 | Japan | 364/474.26 |

Primary Examiner—Geoffrey S. Evans
Attorney, Agent, or Firm—Antonelli, Terry, Stout & Kraus

[57] ABSTRACT

A drawing system in a wire-cut electrodischarge machine having two rectilinear motion devices arranged at right angles on a base for moving a workpiece and a wire relatively to each other, comprising a writing device, a cylindrical drawing mount supported rotatably, and a motion converter for converting linear movement into rotational movement, the drawing mount being connected via the motion converter to one of the rectilinear motion devices while the writing device is connected to the other of the rectilinear motion devices.

4 Claims, 4 Drawing Sheets

DRAWING SYSTEM IN A WIRE-CUT ELECTRODISCHARGE MACHINE

BACKGROUND OF THE INVENTION

The present invention relates to a drawing system in a wire-cut electrodischarge machine.

Wire-cut electrodischarge machines, in which a wire is moved relative to a workpiece in an X-Y plane while electric power is supplied to the machining station thereof, are generally numerically controlled so that they can effect machining with a good accuracy. When a checking has been performed to make sure that there are no errors in input data before machining is effected, the machining can then be performed strictly in accordance with the design drawing prepared for such machining and therefore it is possible to reduce the occurrence of erroneous machining. A prior art method of checking input data will be described.

The machining lines along which wire electrodischarge machining is to be effected are generally complicated figures. However, it is possible to reduce the occurrence of erroneous machining by having the figure drawn on a sheet by means of the drawing system provided in the machine and checking the so drawn figure with the design drawing so as to find out errors.

In the prior art drawing systems, however, the drawing board for carrying a drawing sheet thereon must be of the size corresponding to the extent (hereinafter called "stroke") to which the machine's table or column carrying a pen can move. It is therefore necessary to make the drawing board larger as the stroke of the wire-cut electrodischarge machine becomes larger. Consequently, there is a problem in that the floor space required for installing a wire-cut electrodischarge machine of large stroke having a drawing system provided is correspondingly large.

SUMMARY OF THE INVENTION

An object of the present invention is to obviate the above-mentioned problem by providing a drawing system in a wire-cut electrodischarge machine, which is arranged such that the machine's stroke can be increased without increasing the floor space for its installation.

To achieve the object, the present invention provides, in a wire-cut electrodischarge machine having two rectilinear motion devices arranged at right angles on a base for moving a workpiece and a wire relatively to each other, a drawing system which includes a writing device, a cylindrical drawing mount supported rotatably, and a motion converter for converting linear movement into rotational movement, the drawing mount being connected via the motion converter to one of the rectilinear motion devices while the writing device is connected to the other of the rectilinear motion devices, whereby the floor space for the installation of the machine can be small.

DESCRIPTION OF THE PREFERRED EMBODIMENTS

Preferred embodiments of the present invention will now be described together with related prior art with reference to the accompanying drawings.

First, a method of checking data input to a prior art wire-cut electrodischarge machine will be described with reference to FIG. 4.

Figure 4:
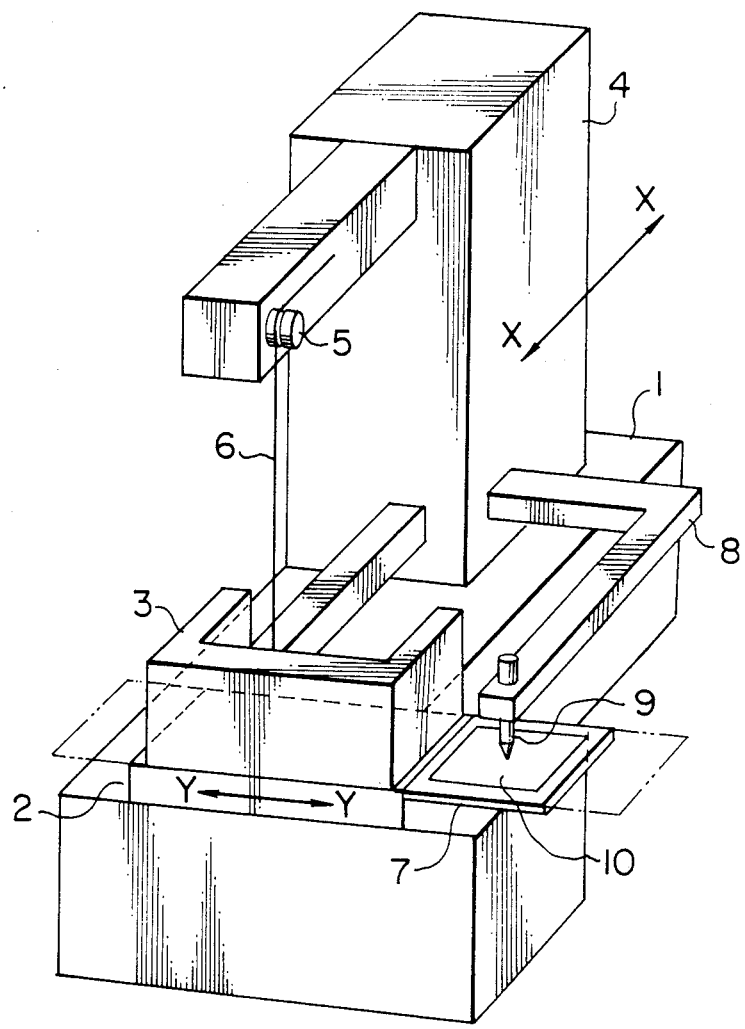
FIG. 4 is a schematic diagram showing principal parts of a prior art wire-cut electrodischarge machine.

FIG. 4 is a schematic diagram showing principal parts of a prior art wire-cut electrodischarge machine, wherein reference numeral 1 designates a base, and 2 designates a table which is movable relative to the base 1 in Y-directions. 3 designates a workpiece mount fixed to the table 2. 4 designates a column which is movable relative to the base 1 in X-directions. 5 designates a roller rotatably mounted on the column 4 for guiding a wire 6. 7 designates a drawing board fixed to the table 2. 8 designates an arm fixed to the column 4. 9 designates a pen. 10 designates a paper sheet placed on the drawing board 7.

Data is input to the computer (not shown) for controlling the machine in accordance with a design drawing (not shown). When the machine is controlled in accordance with the input data, the table 2 and column 4 are moved to draw a figure on the sheet 10, the figure corresponding to the input data which in turn corresponds to the design drawing. The drawing board 7, arm 8 and pen 9 constitute the drawing system in the wire-cut electrodischarge machine.

The machining lines along which wire-cut electrodischarge machining is to be effected are generally complicated figures. However, it is possible to reduce the occurrence of erroneous machining by having the figure drawn on a sheet 10 by means of the drawing system provided in the machine and checking the so drawn figure with the design drawing so as to find out errors.

In the prior art drawing system, however, the drawing board 7 must be of the size corresponding to the extent or the stroke to which the machine's table 2 or column 4 can move. It is therefore necessary to make the drawing board 7 larger as the stroke of the wire-cut electrodischarge machine becomes larger. Consequently, there is a problem in that the floor space required for installing a wire-cut electrodischarge machine of large stroke having a drawing system provided is correspondingly large.

Figure 1:
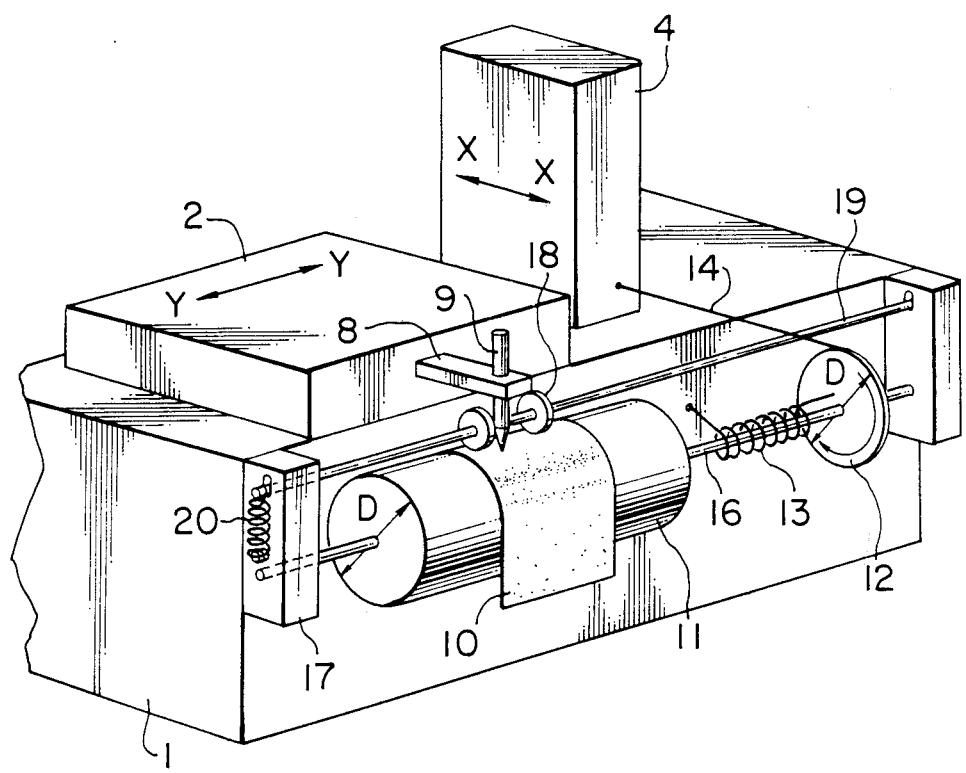
FIG. 1 is a perspective view showing a first embodiment of the drawing system in a wire-cut electrodischarge machine according to the present invention.

FIG. 1 is a perspective view showing a first embodiment of the drawing system in a wire-cut electrodischarge machine, according to the present invention. Those which have equivalents in FIG. 4 are designated by the same reference numerals.

11 designates a cylindrical drawing mount having a diameter "D". 16 designates a shaft fixed at the center of the drawing mount 11. 17 designates a support fixed to the base 1 for rotatably supporting the shaft 16. 12 designates a pulley fixed to the shaft 16. 13 designates a torsion spring having one end fixed to the pulley 12 and the other end fixed to the base 1 for urging the pulley 12 in the rotational direction indicated by an arrow. 14 designates a wire rope wound around the pulley 12 and having one end fixed to the pulley 12 and the other end fixed to the column 4 which is movable in X-directions on the base 1. The pulley 12 having the wire rope 14 wound thereon has a diameter which is equal to the diameter "D" of the cylindrical drawing mount 11. 18 designates a pressure roller which is rotatably supported on the shaft 19 and which can be positioned at any desired location on the shaft 19. Since the shaft 19 is supported by the support 17 in a slidable manner in the direction of the center of rotation of the drawing mount 11 while being urged by the spring 20 in the direction of the center of rotation of the drawing mount 11, the pressure rollers 18 and the cylindrical drawing mount 11 are always in contact at their peripheries and the pressure rollers 18 will rotate following the rotation of the cylindrical drawing mount 11. Further, a pen 9 is mounted on an arm 8 which is mounted on the table 2 which in turn is movable in Y-directions. The tip of the pen 9 is directed toward the center of rotation of the drawing mount 11.

The pen 9 is mounted on the arm, and subsequently a paper sheet 10 is placed on the drawing mount 11 and is then pressed by the pressure rollers 18. Subsequently, without any workpiece mounted, the table 2 and the column 4 are operated in accordance with data input based on a design drawing. Since the pulley 12 are always urged in the direction of an arrow by means of the torsion coil spring 13, the pulley 12 is rotated with the drawing mount 11 coaxially fixed to the shaft 16 via the wire rope 14 as the column 4 is moved. Since the pulley 12 has the same diameter "D" as the drawing mount 11, the paper sheet 10 will then move the same distance as the column 4 which is moved X-directions. Meanwhile, the pen 9 moves with the table 2 which moves in Y-directions, so that a figure corresponding to the input data will be drawn on the paper sheet 10. It is then possible to find out errors in the input data by checking the so drawn figure against the design drawing, and therefore it is possible to reduce the occurrence of erroneous machining.

An example of an application of the drawing system of the present invention to a wire-cut electrodischarge machine, such as the one disclosed in U.S. Ser. No. 360,131, will be described with reference to FIG. 2 in which the same reference numerals as in FIGS. 1 and 4 are used to indicate the like components or members.

A frame 4 carries thereon a pair of bearings 109b is guided by a pair of rails 109a. A feed screw 135 is connected to a motor 110 and is threadedly engaged with a nut (not shown) mounted on the frame 4. A U-axis moving means is arranged inside a recess 132 formed in the frame 4. The U-axis moving means 131 is provided with bearings (not shown) common to the bearings 109b and is guided also by the rails 109a. A motor 133 provided with a brake is mounted on the frame 4. A feed screw 136 is connected to the motor 133 and is threadedly engaged with a nut (not shown) mounted on the U-axis moving means 131. A center of movement of the U-axis moving means 131 is identical with the center position of the recess 132. Also, a Z-axis quill 111 is mounted on the U-axis moving means 131. A V-axis moving means 134 carries bearings 118b thereon and is guided by rails 118a. Also, the upper guide 123 is mounted on the V-axis moving means 134 which in turn is movably mounted on a flange, so that the upper guide 123 and the V-axis moving means 134 are movable relative to the flange 115 is the V—V direction.

The wire 6 wound around the reel 124 is introduced into the upper guide 123 and is passed through the lower guide 113 to be wound by the rollers 125 so as to cut the work 106.

Further detailes of the wire-cut electrodischarge machine may be referred to the disclosure of U.S. Ser. No. 360,131 mentioned above.

Figure 2:
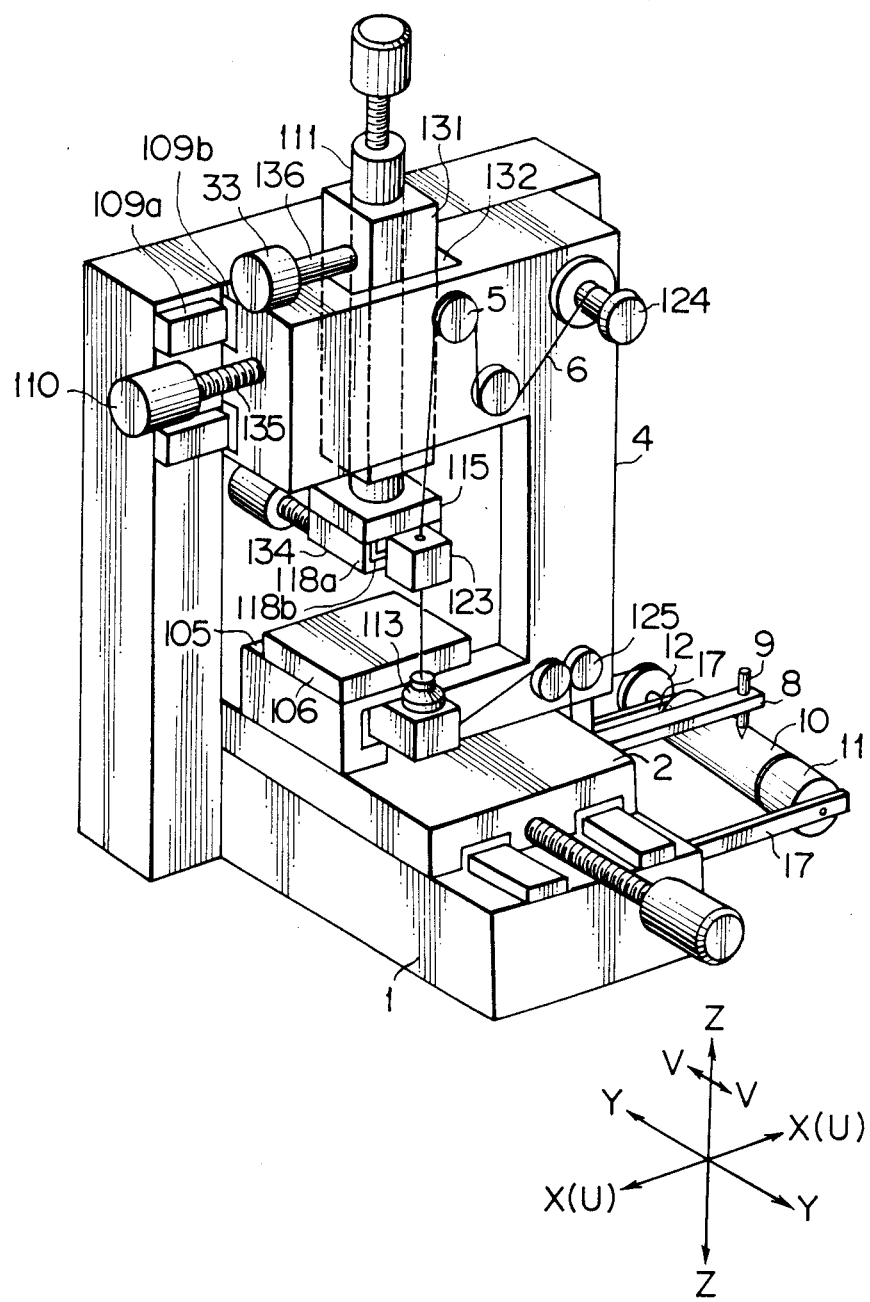
FIG. 2 is a perspective view showing a wire-cut electrodischarge machine mounted with the drawing system shown in FIG. 1.

The drawing system of the present invention is schmatically illustrated in FIG. 2, but the detailed construction thereof may be referred to the preceeding explanation of the first embodiment shown in FIG. 1.

The operation of the wire-cut electrodischarge machine for cutting a workpiece will now be explained with reference to an example of a workpiece 106 having parallel upper and lower surfaces.

The workpiece 106 is loaded on a loading surface 105 and the upper guide 123 is positioned in the reference position, i.e. the starting point of machining. The braking of the motor 133 is effected to thereby stop the rotation of the feed screw 136. Thus, the U-axis moving means 131 is kept in unison with the frame 4 through the feed screw 136. Subsequently, in order to prevent any electric discharge in the air and to remove sluges generated during the machining operation, a machining liquid is supplied from the upper guide 123 and the lower guide 13 in a coaxial manner with the wire 6. Then, an electric power is supplied to the wire 6. The table 2 and the frame 4 are moved, respectively, so that the wire 6 and the workpiece 106 are moved relative to each other in the X- and Y-axis directions, thereby performing the vertical machining.

In the same manner, the U-axis moving means 131 and the V-axis moving means 134 are operated, and the relative position of the upper guide 123 to the lower guide 113 is changed, thereby performing the inclined machining.

When the drawing system of the present invention is to be used, the pen 9 and the paper sheet 10 are properly mounted, and the table 2 and the column 4 are operated without any workpiece in accordance with the data input based on the design drawing, whereby the figure corresponding to the input data will be drawn on the paper sheet 10 so that the input data may be checked.

Figure 3:
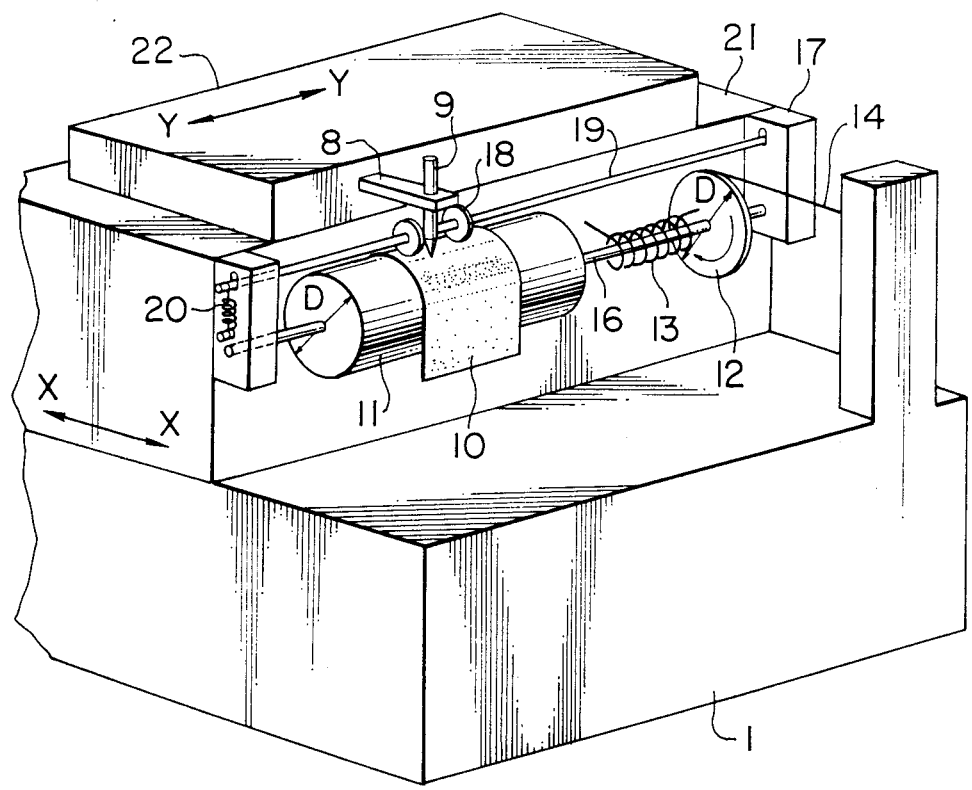
FIG. 3 is a perspective view showing a second embodiment of the drawing system in a wire-cut electrodischarge machine according to the present invention.

FIG. 3 is a perspective view showing a second embodiment of the drawing system in a wire-cut electrodischarge machine according to the present invention. While in the first embodiment of the wire-cut electrodischarge machine the column 4 carrying a wire 6 thereon is moved in X-directions and the table 2 carrying a workpiece thereon is moved in Y-directions, respectively, relative to the fixed base 1, the second embodiment of FIG. 3 is arranged such that a wire (not shown) is mounted on a fixed base 1, and tables 21 and 22 carrying a workpiece thereon are movable in X- and Y-directions, respectively. In FIGS. 1 and 3, identical parts or elements, or parts or elements of the same function, are designated by the same reference numerals.

21 designates an X-table which is movable on the base 1 in X-directions. 22 designates a Y-table which is movable on the table 21 in Y-directions. The shaft 16 for carrying the drawing mount 11 and the pulley 12 thereon is rotatably supported on the supports which are fixed to one side of the X-table 21. The torsion coil spring 13 has one end thereof fixed to the pulley 12 and the other end thereof fixed to the X0table 21. The wire rope 14 has one end thereof fixed to the pulley 12 and the other end thereof fixed to the base 1. The second embodiment will operate in an almost identical manner with the first embodiment, but the description of the operation will be repeated.

The pen is mounted on the arm 8, and the paper sheet 10 is placed on the drawing mount 11 and is then pressed by the pressure rollers 18. Without any workpiece mounted, the X-table 21 and Y-table 22 are then operated in accordance with data input based on a design drawing. The pulley 12 and the drawing mount 11 which is coaxial with the pulley 12 are rotated via the wire rope 14 as the X-table 21 is moved. Since the pulley 12 has the same diameter "D" as the outer diameter of the drawing mount 11, the paper sheet 10 will move the same distance as the X-table 21 which moves in X-directions. Meanwhile, the pen 9 will move with the Y-table 22 which moves in Y-directions, so that a figure corresponding to the input data will be drawn on the paper sheet 10.

In the first and second embodiments, the paper sheet 10 is squeezed between the drawing mount 11 and pressure rollers 18. The pressure rollers 18 may not be provided where the sheet 10 is attached to the drawing mount 11 by means of an adhesive tape, for example. On the other hand, figures may be more accurately drawn on the sheet 10 where the cylindrical drawing mount 11 has an outer diameter which is smaller than the outer diameter of the pulley 12 by the thickness of the paper sheet 10 but, since the thickness of the sheet 10 is generally thin, e.g. 0.1 millimeter, practically the drawing mount 11 and the pulley may have the same outer diameter.

As described in detail, in accordance with present invention a paper sheet 10 is placed on the surface of a cylindrical drawing mount 11. That is, the floor space required to install a wire-cut electrodischarge machine 11 having a stroke of "$\pi D$" will theoretically be "D" in accordance with the present invention, where $\pi$ represents the ratio of the circumference of a circle to its diameter. The present invention therefore has an advantage that it makes it possible to reduce the floor space required to install a wire-cut electrodischarge machine.

What is claimed is:

1. A drawing system in a wire-cut electrodischarge machine having two rectilinear motion devices arranged at right angles on a base for moving a workpiece and a wire relatively to each other, comprising a writing device, a cylindrical drawing mount supported rotatably on the base, and a motion converter for converting linear movement into rotational movement, the drawing mount being connected via the motion converter to one of the rectilinear motion devices while the writing device is connected to the other of the rectilinear motion devices.

2. The drawing system in a wire-cut electrodischarge machine as claimed in claim 1, wherein said motion converter comprises a pulley connected to said cylindrical drawing mount.

3. A drawing system in a wire-cut electrodischarge machine having two rectilinear motion devices arranged at right angles on a base for moving a workpiece and a wire relatively to each other, comprising a writing device, a cylindrical drawing mount supported rotatably on the base, and a motion converter for converting linear movement into rotational movement, the drawing mount being rotatably supported on one of the rectilinear motion devices and being connected to the base via the motion converter, the writing device being connected to the other of the rectilinear motion devices.

4. The drawing system in a wire-cut electrodischarge machine as claimed in claim 3, wherein said motion converter comprises a pulley connected to said cylindrical drawing mount.

* * * * *